R. E. MORRISON.
SIGNALING DEVICE.
APPLICATION FILED NOV. 24, 1916.

1,278,718.

Patented Sept. 10, 1918.
2 SHEETS—SHEET 1.

R. Elmore Morrison, Inventor

By Talbert & Parker
Attorneys

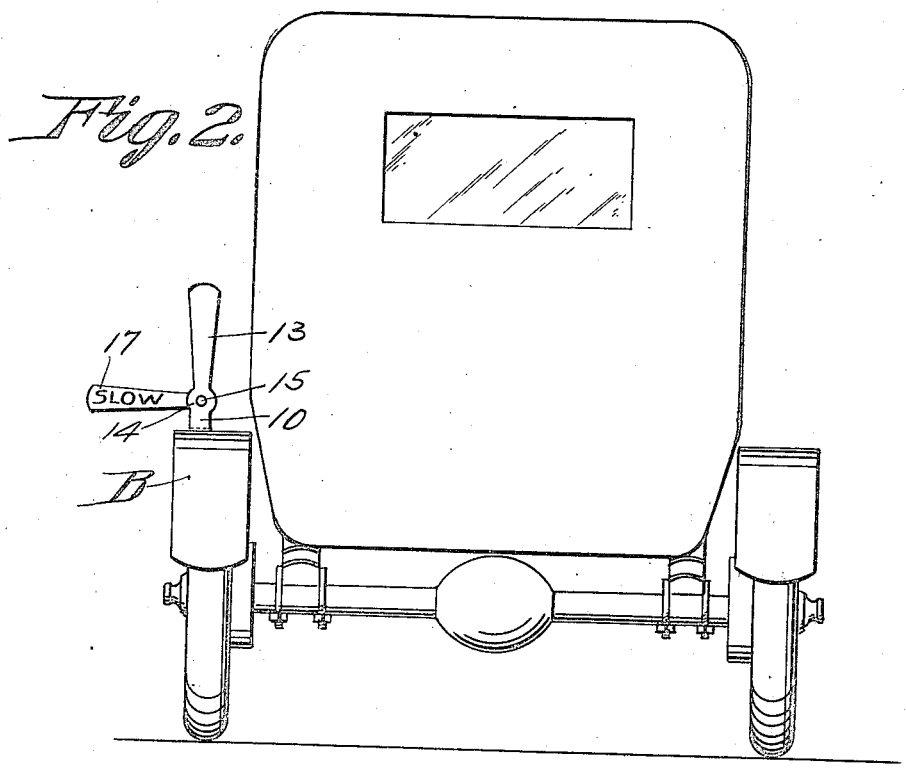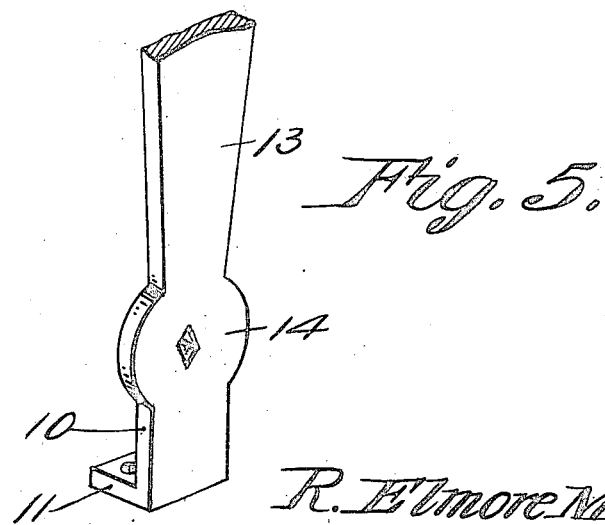

UNITED STATES PATENT OFFICE.

ROBERT E. MORRISON, OF COLLIERSVILLE, TENNESSEE.

SIGNALING DEVICE.

1,278,718.

Specification of Letters Patent. Patented Sept. 10, 1918.

Application filed November 24, 1916. Serial No. 133,279.

*To all whom it may concern:*

Be it known that I, ROBERT E. MORRISON, a citizen of the United States, residing at Colliersville, in the county of Shelby and State of Tennessee, have invented certain useful Improvements in Signaling Devices, of which the following is a specification, reference being had therein to the accompanying drawing.

The invention relates to a signaling device, and more particularly to the class of signaling attachments for vehicles, automobiles or the like.

The primary object of the invention is the provision of a signaling attachment of this character wherein a movable arm bearing indicia is supported upon one of the rear mud guards of a vehicle, particularly an automobile, and this arm can be thrown to a position so that the indicia thereon is visible to the traffic in the rear of the automobile and thus indicate whether or not the automobile will move at reduced speed or come to a standstill, and in this manner obviating any possibility of rear end collisions or accidents.

Another object of the invention is the provision of a signaling attachment of this character wherein the movable arm forming the signaling flag or blade is automatically controlled by the foot brake lever within the body of the vehicle, thereby eliminating the necessity of the operator manually signaling in the usual manner when the car is to travel slow or make a turn from a direct course.

A further object of the invention is the provision of a signal of this character wherein the construction thereof is unique and automatically controlled, the signal being readily visible from the rear end of the vehicle either by day or night and is readily and easily mounted in place without necessitating any changes or alterations in the construction of the vehicle.

A still further object of the invention is the provision of a signal of this character which is simple in construction, thoroughly reliable and efficient in its purpose, strong, durable and inexpensive in manufacture.

Other objects will be in part obvious and in part hereinafter described.

The invention accordingly consists in the features of construction, combination of elements and arrangement of parts which will be exemplified in the construction hereinafter described, and the scope of the application of which will be indicated in the appended claims.

In the accompanying drawings:

Fig. 2 is a rear elevation of an automobile with the signal arm in lowered signaling position;

Fig. 5 is a perspective view of the main support of the signaling attachment.

Similar reference characters indicate corresponding parts throughout the several views of the drawings.

Figure 1:
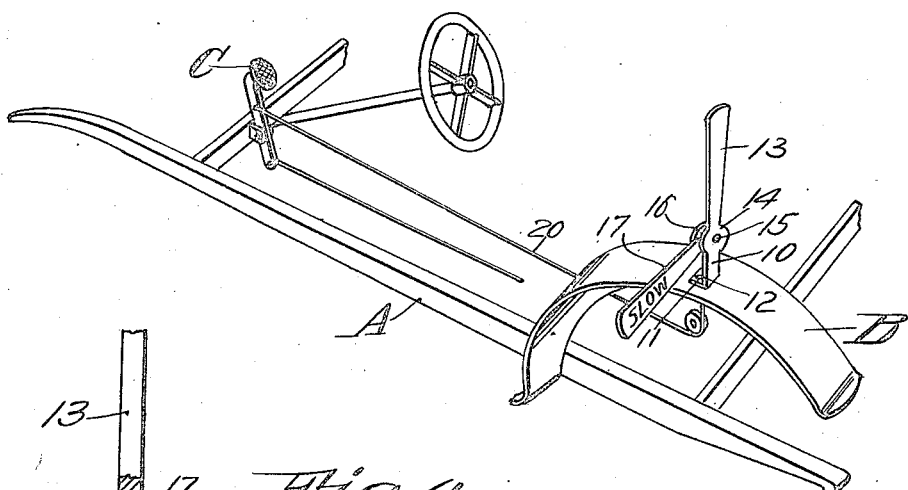
Figure 1 is a fragmentary perspective view of the chassis of an automobile, with the side rear mud guard, showing the signal attachment constructed in accordance with the invention applied, with its connection to the brake foot lever or pedal.
Figure 4:
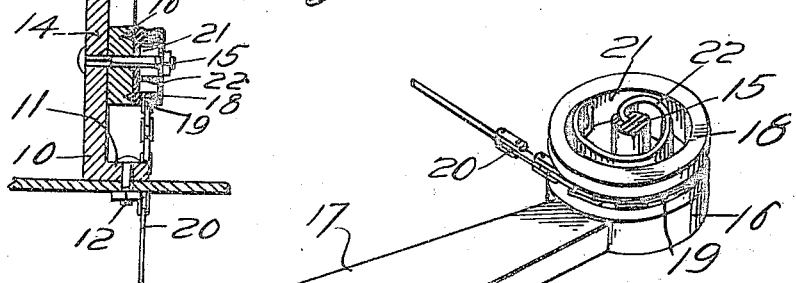
Fig. 4 is an enlarged fragmentary vertical sectional view through the signaling attachment.
Figure 3:
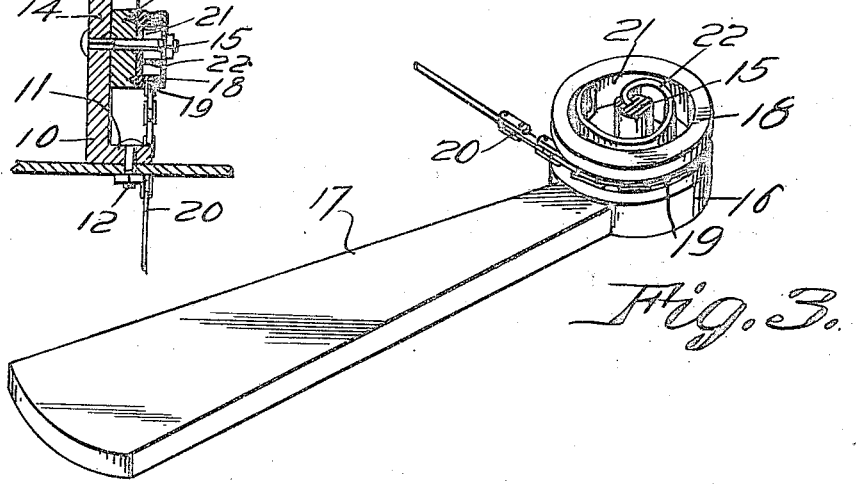
Fig. 3 is a perspective view of the movable signal arm detached.

Referring to the drawings in detail, A designates a portion of the chassis of an automobile; B, one of the side rear mud guards and C the brake foot lever, which is hung in the usual manner and is in convenient reach of the operator within the automobile, as usual.

On the rear mud guard B at a suitable point thereof is mounted the signaling attachment hereinafter fully described.

The signaling attachment comprises a standard 10 which is formed at its lower end with a base 11 at right angles thereto through which is passed a pair of bolts or other fasteners 12, the same being also passed through the body of the rear mud guard B for the securing of the support thereon so that the said support will stand vertically, the major portion of the support being preferably in the form of a casing or shield 13 and is preferably painted or otherwise coated to give a neat and attractive appearance thereto. Carried in the support, centrally of a substantially circular portion 14 thereof, is a pivot 15 which is also loosely passed through the hub end 16 of a movable signaling arm or blade 17, which latter is correspondingly shaped to the casing or shield 13 and is adapted to register therewith when in non-signaling position. The rearmost face of said blade or arm 17 has printed or otherwise marked thereon the word Slow, which is indicative of the speed of travel of the automobile so as to signify to the traffic in rear thereof that the speed of travel of the automobile will be reduced on the swinging of said blade or arm 17 to lowered position or at right angles to the casing or shield 13, which is the signaling position to check traffic rearwardly of the advancing or moving automobile on which the signal is in use.

On the hub 16 of the blade or arm 17 is a pulley 18 in the peripheral groove 19 of which is fixed one end of a flexible member 20 which is suitably trained from the point of the signal forwardly of the automobile and is connected to the foot lever or pedal C so that when the operator applies the brakes of the automobile by depressing the foot lever or pedal C the signal blade 17 will be moved from normal perpendicular position to lowered horizontal position, thereby displaying the indicia thereon indicative of the fact that the speed of the automobile will be reduced so that traffic in the rear will be cognizant of the fact and thus obviate rear end collisions or accidents.

The pulley 18 is formed with a hollow center 21 in which is housed a coiled tension spring 22, one end of which is fixed to the pivot 15 and its opposite end fixed to the wall of the recess or hollow 21 in said pulley, and this spring is tensioned on the lowering of the arm or blade 17 to signaling position, and when the foot lever or pedal C is released to free the brakes the spring 22 will become active for automatically raising the blade or arm 17 to normal position in registration with the casing or shield 13 and the latter conceals said blade or arm 17 and the indicia thereon.

It is of course to be understood that in lieu of the word Slow any other word can be substituted for the proper signaling of traffic at the rear of the automobile as to the direction or course of the same or any change in speed of travel thereof.

It is desired to have the blade or arm 17 and the shield or casing 13 made from aluminum and painted white, while the word Slow on the blade or arm 17 is of a different hue or color readily visible and distinguishable by day or night. The signal will be clearly visible at night by reason of the fact that the headlights of an approaching vehicle or automobile at the rear will illuminate the said signal and in the use of the latter the possibility of collision is minimized.

From the foregoing description, taken in connection with the accompanying drawing, the construction and operation of the herein described signaling device will be readily apparent and, therefore, a more extended explanation has been omitted.

Having thus described my invention, I claim:

1. A signaling attachment for automobiles comprising a shield having a base formed at right angles thereto, whereby the shield may be attached in a perpendicular position to the rear mud guard of an automobile, the shield having the shape of a signaling arm, a signaling arm corresponding to the shape of the shield having its one end pivotally attached thereto, the signaling arm being provided with a hub, a resilient member inclosed within the hub and operating normally to hold the signaling member in a vertical position behind the shield, and means whereby the hub of the signaling arm may be connected with the brake operating foot lever of an automobile, so that the signaling arm may be moved from its position behind the shield on the depression of the said foot lever.

2. A signaling attachment for automobiles comprising a support having means for attachment to the rear mud guard of an automobile, a signaling member pivotally mounted on the said support, the signaling member being provided with a hub, the support being provided with a pivot pin with which the hub loosely engages, the hub having a hollow center, a spiral spring inclosed within the hub and having one end in engagement with the pivot pin and the other end in engagement with the inner wall of the hollow portion of the hub, the hub further having a circumferential groove, and a flexible member trained around said groove and having one end fixed therein, the other end being adapted for attachment to the brake operating foot lever of an automobile, whereby the signaling member is held normally in a non-signaling position and is operated only on the depression of said foot lever.

In testimony whereof I affix my signature.

ROBERT E. MORRISON.